US012606171B2

(12) United States Patent
Wassef et al.

(10) Patent No.: US 12,606,171 B2
(45) Date of Patent: Apr. 21, 2026

(54) EYE GAZE AUTOMOTIVE LANE CHANGE ACTIVATION

(71) Applicant: GM GLOBAL TECHNOLOGY OPERATIONS LLC, Detroit, MI (US)

(72) Inventors: Andrew Wassef, Novi, MI (US); Namal P. Kumara, Ypsilanti, MI (US); Paul A. Adam, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 18/760,069

(22) Filed: Jul. 1, 2024

(65) Prior Publication Data

US 2026/0001549 A1 Jan. 1, 2026

(51) Int. Cl.
*B60W 30/18* (2012.01)
*G06V 20/59* (2022.01)

(52) U.S. Cl.
CPC ..... *B60W 30/18163* (2013.01); *G06V 20/597* (2022.01); *B60W 2540/225* (2020.02)

(58) Field of Classification Search
CPC .......... B60K 28/00–165; B60W 30/12; B60W 30/16–17; B60W 30/18163; B60W 30/182; B60W 50/082; G05D 1/0061; G05D 1/0088; G05D 1/021; G05D 1/0214; G05D 1/0221; G05D 1/0223; G06V 20/597
See application file for complete search history.

(56) References Cited

U.S. PATENT DOCUMENTS

| | | | | |
|---|---|---|---|---|
| 11,161,513 B2 * | 11/2021 | Sato | .................. | G01C 21/3691 |
| 11,535,253 B2 * | 12/2022 | Qiao | ..................... | B60W 40/04 |
| 11,548,508 B2 * | 1/2023 | Taniguchi | ............. | B60W 30/10 |

FOREIGN PATENT DOCUMENTS

| | | | | |
|---|---|---|---|---|
| WO | WO-2024261088 A1 * | 12/2024 | ............ | B60W 40/08 |

OTHER PUBLICATIONS

Stiens, WO 2024/261088, machine translation. (Year: 2024).*

* cited by examiner

*Primary Examiner* — Mark L. Greene
(74) *Attorney, Agent, or Firm* — Quinn IP Law

(57) ABSTRACT

A system and method for vehicle lane change activation by eye gaze pattern recognition that includes capturing and sending, using an inward-looking vehicle camera, a video stream of a face of a driver. Based on the video stream a series of eye gaze directions of the driver is estimated and associated with one or more target areas. The computing module controller then recognizes a predetermined transition sequence in the series of eye gaze directions of the driver between a first target area and a second target area, wherein the recognition of the predetermined transition sequence occurs within a first threshold amount of time. Based on the recognition of the predetermined transition sequence in the series of eye gaze directions between the first target area and the second target area, an initiation of a lane change of the vehicle on a roadway is triggered.

20 Claims, 7 Drawing Sheets

500

100

500

510

520

530

540

550

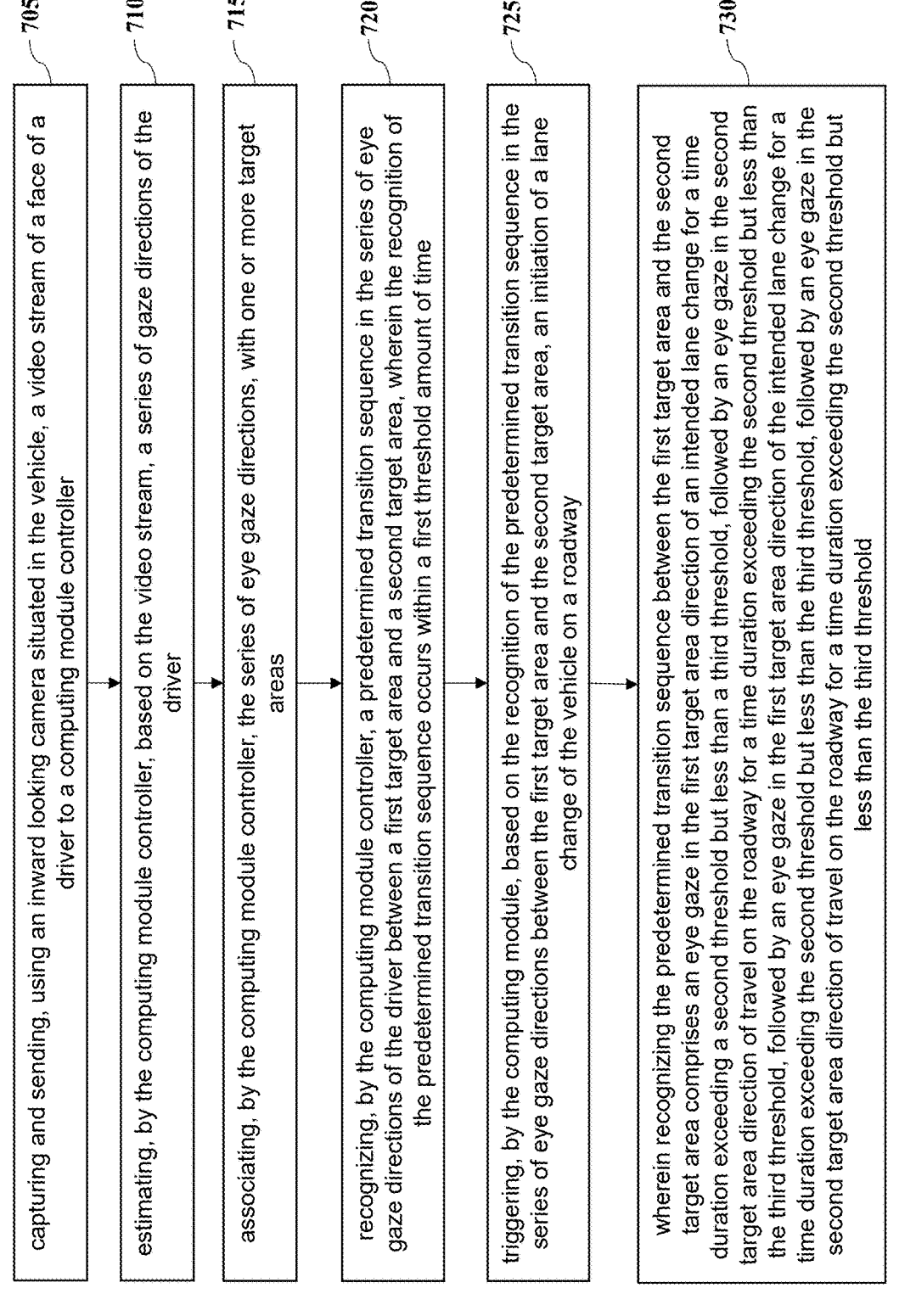

700

705 capturing and sending, using an inward looking camera situated in the vehicle, a video stream of a face of a driver to a computing module controller

710 estimating, by the computing module controller, based on the video stream, a series of gaze directions of the driver

715 associating, by the computing module controller, the series of eye gaze directions, with one or more target areas

720 recognizing, by the computing module controller, a predetermined transition sequence in the series of eye gaze directions of the driver between a first target area and a second target area, wherein the recognition of the predetermined transition sequence occurs within a first threshold amount of time

725 triggering, by the computing module, based on the recognition of the predetermined transition sequence in the series of eye gaze directions between the first target area and the second target area, an initiation of a lane change of the vehicle on a roadway

730 wherein recognizing the predetermined transition sequence between the first target area and the second target area comprises an eye gaze in the first target area direction of an intended lane change for a time duration exceeding a second threshold but less than a third threshold, followed by an eye gaze in the second target area direction of travel on the roadway for a time duration exceeding the second threshold but less than the third threshold, followed by an eye gaze in the first target area direction of the intended lane change for a time duration exceeding the second threshold but less than the third threshold, followed by an eye gaze in the second target area direction of travel on the roadway for a time duration exceeding the second threshold but less than the third threshold

FIG. 7

EYE GAZE AUTOMOTIVE LANE CHANGE ACTIVATION

INTRODUCTION

Vehicles are a staple of everyday life. Special use cameras, microcontrollers, laser technologies, and sensors may be used in many different applications in a vehicle. Cameras, microcontrollers and sensors may be utilized in enhancing automated functionality that offer state-of-the-art experience and services to the customers, for example in tasks such as body control, camera vision, information display, security, autonomous controls, etc. Vehicular vision systems may also be used to assist in vehicle control.

Vehicular vision systems may be used to provide the vehicle operator with information of the environment surrounding the vehicle. The vision systems may also be used to greatly reduce blind spot areas to the sides and rear of the vehicle. Vison systems may also be used to monitor the actions and movements of occupants and the surrounding environment. In particular, driver monitoring systems may include vision systems that may be used to track a vehicle operator's head and eye position and movement, e.g., eye gaze. Eye gaze may generally refer to the direction that a driver's eyes are fixated at any given instant. Such systems may detect an operator's eye gaze and may be used in numerous useful applications including detecting driver distraction, driver control, situational awareness, and automated driving controls. However, driver monitoring systems may also be prone to false activations. Accordingly, it is desirable to provide pattern-based recognition of eye gaze patterns to initiate an automotive function.

SUMMARY

Disclosed herein are a system and methods for vehicle lane change activation by eye gaze pattern recognition. As disclosed herein, a system for vehicle lane change activation by eye gaze pattern recognition may include an inward-looking camera, situated in the vehicle, that may be positioned to capture and send a video stream of a face of a driver to a computing module controller. The computing module controller, based on the video stream, may then estimate a series of eye gaze directions of the driver, including associating the series of eye gaze directions with one or more target areas. Further, the computing module controller may recognize a predetermined transition sequence in the series of eye gaze directions of the driver between a first target area and a second target area that may occur within a first threshold amount of time. The system, upon recognition of the predetermined transition sequence of eye gaze directions of the driver between the first target area and the second target area, may trigger an initiation of a lane change of the vehicle on a roadway.

Another aspect of the disclosure may be a system where the predetermined transition sequence between the first target area and the second target area may include an eye gaze in the first target area direction of an intended lane change for a time duration exceeding a second threshold but less than a third threshold, followed by an eye gaze in the second target area direction of travel on the roadway for a time duration exceeding the second threshold but less than the third threshold, followed by an eye gaze in the first target area direction of the intended lane change for a time duration exceeding the second threshold but less than the third threshold, followed by an eye gaze in the second target area direction of travel on the roadway for a time duration exceeding the second threshold but less than the third threshold.

Another aspect of the disclosure may be a system where the first target area is a side view mirror of the vehicle.

Another aspect of the disclosure may be a system where if the eye gaze in the first target area direction of an intended lane change for a time duration exceeds the third threshold, the recognition of the predetermined transition sequence may be terminated.

Another aspect of the disclosure may include a system where if the eye gaze in the second target area direction of the direction of travel on the roadway for a time duration exceeds the third threshold, the recognition of the predetermined transition sequence may be terminated.

Another aspect of the disclosure may include a system where if the series of eye gaze directions include one or more intermediary eye gazes outside of the first target area or the second target area for a time duration greater than the second threshold, the recognition of the predetermined transition sequence may be terminated.

Another aspect of the disclosure may include a system where if an eye gaze in the direction of the intended lane change is for a time duration less than the second threshold, then the recognition of the predetermined transition sequence may be terminated.

Another aspect of the disclosure may include a system that includes a feedback device used to generate a visual, auditory, or haptic signal to indicate the initiation of a lane change of the vehicle on a roadway.

Another aspect of the disclosure may include a system that includes an input sensor that receives one or more rejection signals to abort an initiation of a lane change of the vehicle on the roadway.

Another aspect of the disclosure may include a method for vehicle lane change activation by eye gaze pattern recognition that includes capturing and sending, using an inward-looking camera situated in the vehicle, a video stream of a face of a driver to a computing module controller. The method may further include estimating, by the computing module controller, based on the video stream, a series of eye gaze directions of the driver and associating, by the computing module controller, the series of eye gaze directions, with one or more target areas. The method may continue by recognizing, by the computing module controller, a predetermined transition sequence in the series of eye gaze directions of the driver between a first target area and a second target area. Once recognized, the method may continue where the recognition of the predetermined transition sequence occurs within a first threshold amount of time and then triggering, by the computing module, based on the recognition of the predetermined transition sequence in the series of eye gaze directions between the first target area and the second target area, an initiation of a lane change of the vehicle on a roadway.

Another aspect of the method may include recognizing the predetermined transition sequence between the first target area and the second target area includes an eye gaze in the first target area direction of an intended lane change for a time duration exceeding a second threshold but less than a third threshold, followed by an eye gaze in the second target area direction of travel on the roadway for a time duration exceeding the second threshold but less than the third threshold, followed by an eye gaze in the first target area direction of the intended lane change for a time duration exceeding the second threshold but less than the third threshold, followed by an eye gaze in the second target area direction of travel on the roadway for a time duration exceeding the second threshold but less than the third threshold.

Another aspect of the method may include where the first target area is a side view mirror of the vehicle.

Another aspect of the method may include where if the eye gaze in the first target area direction of an intended lane change for a time duration exceeds the third threshold, the recognition of the predetermined transition sequence is terminated.

Another aspect of the method may include where if the eye gaze in the second target area direction of the direction of travel on the roadway for a time duration exceeds the third threshold, the recognition of the predetermined transition sequence is terminated.

Another aspect of the method may include where if the series of eye gaze directions further includes one or more intermediary eye gazes outside of the first target area or the second target area for a time duration greater than the second threshold, the recognition of the predetermined transition sequence is terminated.

Another aspect of the method may include where if an eye gaze in the direction of the intended lane change is for a time duration less than the second threshold, then the recognition of the predetermined transition sequence is terminated.

Another aspect of the method may include generating a visual, auditory, or haptic signal by a feedback device to indicate the initiation of a lane change of the vehicle on a roadway.

Another aspect of the method may include where the second threshold is one second and the third threshold is five seconds.

Another aspect of the method may include monitoring for a receipt of one or more rejection signals to abort an initiation of a lane change of the vehicle on the roadway.

Another aspect of the disclosure may include a method for vehicle lane change activation by eye gaze pattern recognition that includes capturing and sending, using an inward-looking camera situated in the vehicle, a video stream of a face of a driver to a computing module controller. The method may further include estimating, by the computing module controller, based on the video stream, a series of eye gaze directions of the driver and associating, by the computing module controller, the series of eye gaze directions, with one or more target areas. The method may continue by recognizing, by the computing module controller, a predetermined transition sequence in the series of eye gaze directions of the driver between a first target area and a second target area. The method may further include where the recognition of the predetermined transition sequence occurs within a first threshold amount of time, where recognizing the predetermined transition sequence includes an eye gaze in the first target direction of an intended lane change for a time duration exceeding a second threshold but less than a third threshold, followed by an eye gaze in the second target area direction of travel on the roadway for a time duration exceeding the second threshold but less than the third threshold, followed by an eye gaze in the first target area direction of the intended lane change for a time duration exceeding the second threshold but less than the third threshold, followed by an eye gaze in the second target area direction of travel on the roadway for a time duration exceeding the second threshold but less than the third threshold. The method may also include where if the eye gaze in the first target area direction of an intended lane change for a time duration exceeds the third threshold, the recognition of the predetermined transition sequence is terminated. The method may include where if the eye gaze in the second target area direction of the direction of travel on the roadway for a time duration exceeds the third threshold, the recognition of the predetermined transition sequence is terminated. The method may also include where the eye gaze in the first target area direction of an intended lane change is directed towards a side view mirror of the vehicle. The method may include where if the predetermined transition sequence further includes one or more intermediary eye gazes outside of the first target area or the second target area and one or more of the intermediary eye gazes occurs for a time duration greater than the second threshold, the recognition of the predetermined transition sequence is terminated. The method may also include where if an eye gaze in the first target area direction of the intended lane change is for a time duration less than the second threshold, then the recognition of the predetermined transition sequence is terminated. The method may include where the second threshold is one second and the third threshold is five seconds. The method may also include triggering, by the computing module, based on the recognition of the predetermined transition sequence in the series of eye gaze directions between the first target area and the second target area, an initiation of a lane change of the vehicle on a roadway. The method may also include generating a visual, auditory, or haptic signal by a feedback device to indicate the initiation of a lane change of the vehicle on a roadway. The method may also include monitoring for a receipt of one or more rejection signals to abort an initiation of a lane change of the vehicle on the roadway.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 7 is a flowchart of a method for vehicle lane change activation by eye gaze pattern recognition, in accordance with the disclosure The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figure 1:
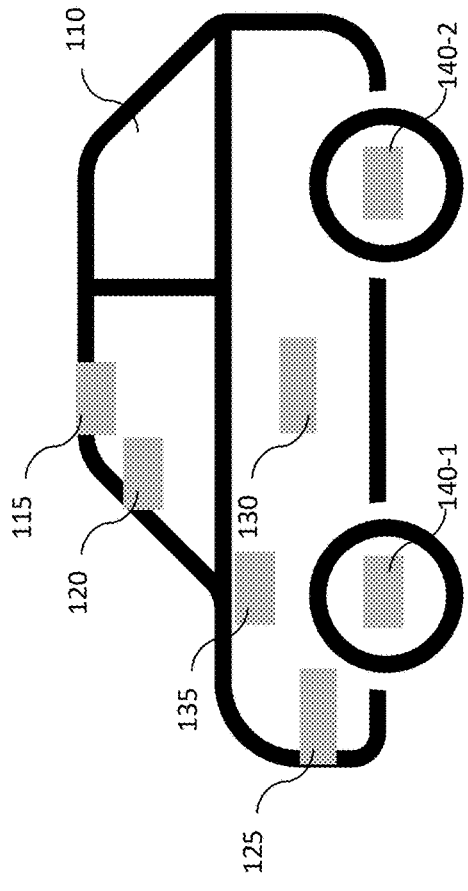
FIG. 1 is an illustration of a variety of possible vehicle sensors, in accordance with the disclosure.

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
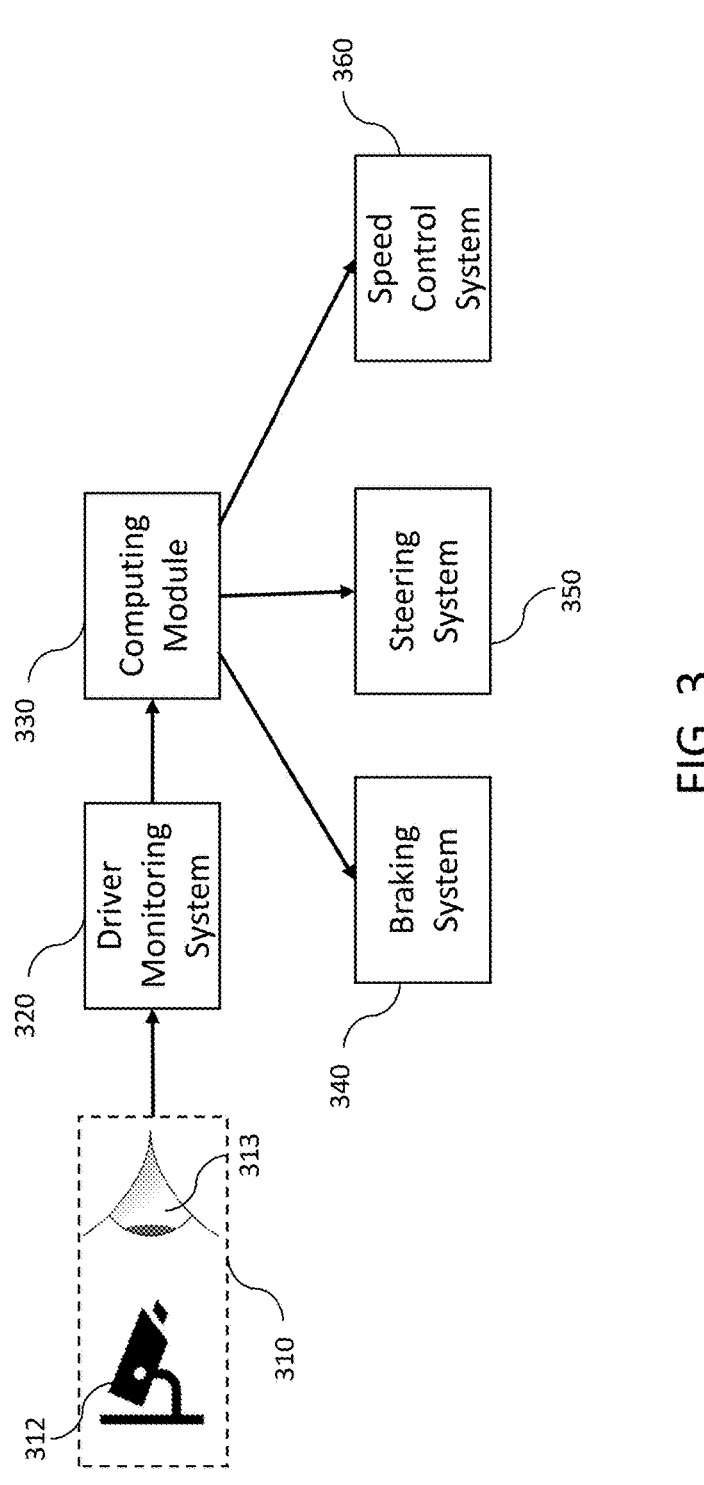
FIG. 3 is a block diagram of an eye gaze pattern recognition system, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with cameras, multiple microcontrollers, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle.

Further, during roadway operation of a vehicle by a vehicle operator, semi-autonomously or fully autonomous, the driver may desire to initiate an automotive function. Such a function may be a variety of actions, including the ability to initiate a changing of lanes for the vehicle traveling on a roadway. The use of eye gaze tracking may be used to initiate such a function. However, in order to minimize false initiations of such a function, eye gaze pattern recognition may be used to qualify and minimize false initiations.

Driver, operator, vehicle operator are terms that are meant to be interchangeable and are not meant to limit the scope of the disclosure.

FIG. 1 is an illustration of a vehicle with integrated sensors 100, according to an embodiment of the present disclosure. Such sensors may assist in the use of automated functions, such as autonomous driving and, as discussed, the ability to initiate an automated vehicle action such as a lane change operation. For example, vehicle 110 may include a Light Detection And Ranging (Lidar) sensor 115, an inward or outward camera sensor 120, an ultrasonic sensor 125, an inertial measurement unit (IMU) sensor 130, a steering angle sensor 135, and wheel speed sensors 140-1 and 140-2, to name a few.

Figure 2:
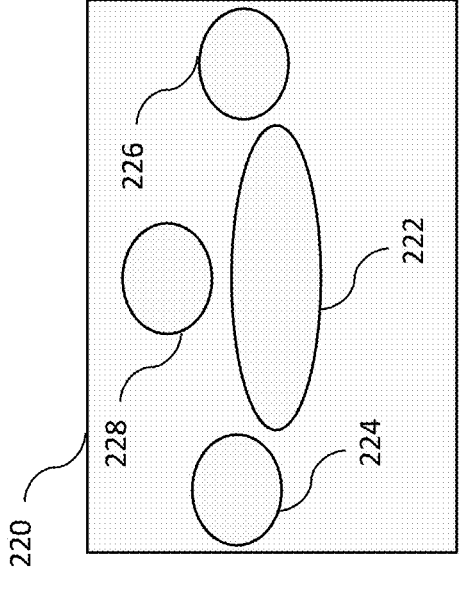
FIG. 2 is an illustration of eye gaze tracking, in accordance with the disclosure.
Figure 2:
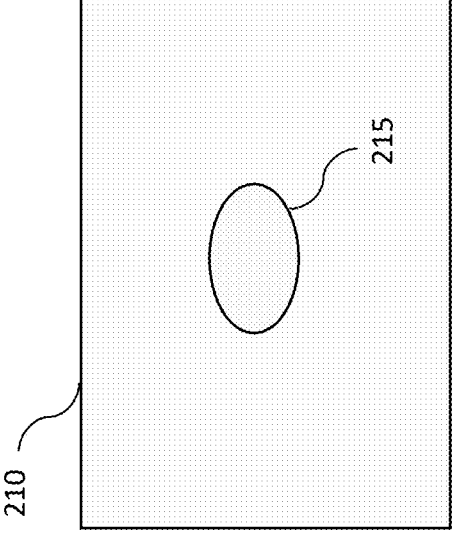

FIG. 2 is an illustration of a gaze pattern 210 and a gaze pattern 220 from the perspective of a vehicle operator looking out of a front windshield, according to an embodiment of the present disclosure. Gaze pattern 210 may contain a single area, for example target area 215. Target area 215 represents a cluster of eye gaze directional points. Further, eye gaze data points are continuous, and may also be referred to as floats. Target area 215 may represent a vehicle operator's gaze straight ahead, for example when driving down a straight highway. In such a scenario there may be little need to look far right or far left. Further, such a gaze may also infer that traffic may be fairly light as there appears to be little eye gaze direction towards a rearview mirror or side mirrors, if so equipped.

In contrast, gaze pattern 220 represents four distinct areas. Target area 222 may represent looking forward, but it is wider than target area 215 and therefore represents an eye gaze pattern of scanning a wider field of view than that of target area 215. Further, gaze pattern 220 may also include target area 228 representing the vehicle operator looking at the rearview mirror. In addition, target area 224 may represent the vehicle operator looking at the left-hand side mirror and target area 226 may represent the vehicle operator looking at the right-hand side mirror. Accordingly, gaze pattern 220 does not appear to represent the same pattern, and hence the same driving situation as gaze pattern 210. Gaze pattern 220 may more closely correspond to city or highway driving, or a more congested highway driving scenario where the driver may tend to check the mirrors on a fairly frequent basis, including heavy traffic that may involve lane changes.

Eye gaze direction data is a sequence that may be represented as follows:

$$(x_0, y_0), (x_1, y_1), \ldots, (x_{t-1}, y_{t-1}), (x_t, y_t)$$

Where the subscript denotes time, and the pair is a point on a two-dimensional plane. The joint distribution from which these points are taken may be approximated as a Gaussian mixture as follows:

$$f_{X,Y|\Theta}(x, y \mid \Theta) = \sum_{i=1}^{M} \rho_i F_{X,Y|\theta_i}(x, y \mid \theta_i)$$

Where $\rho_i$ are the component weights and the component densities are Gaussian, thus $\theta_i = \mu_i$, $C_i$ represents the mean and variance of the $i^{th}$ component.

FIG. 3 illustrates an eye gaze pattern recognition system 300, according to an embodiment of the present disclosure.

System 300 may include an inward facing camera component 310 that may include a camera 312 directed to the face and eyes 313 of the vehicle operator. Camera 312 may be a type of imaging device including but not limited to an optical camera, an infrared imaging device, a light-emitting-diode (LED) device, an ultrasound sensor and the like.

System 300 may also include a driver monitoring system 320, a computing module 330, a braking system 340, a steering system 350, and a speed control system 360. In an embodiment, system 300 may operate in a mode where camera 312 produces an image stream of the vehicle operator's face including the eyes 313 and forwards that image stream to the driver monitoring system 320. Communications within system 300 and throughout the vehicle may be accomplished using a controller area network (CAN) bus or other appropriate automotive or standards communication protocol.

Driver monitoring system 320 may then analyze the image stream to estimate the direction of gaze of the vehicle operator. In addition, Driver monitoring system 320, in estimating the direction of gaze of the vehicle operator may also discern if the movements constitute a pattern. As will be discussed, specific eye gaze patterns, whether defined by the driver, or predetermined, may result in the initiation of some type of action. The action may include vehicle functions, such as command to the braking system 340, the steering system 350, and the speed control system 360, or other action as would be known to one of ordinary skill in the art.

Driver monitoring system 320, in its detection and estimating the direction of a gaze by the driver, may determine that a gaze is directed to a specific location or target area within the vehicle, for example, target area 228 that may represent the rearview mirror. target area 224 may represent the left-hand side mirror, and target area 226 may represent the right-hand side mirror. Further, driver monitoring system 320 may determine a time associated with a gaze towards a specific target area. For example, driver monitoring system 320 may determine that the driver gazes at the left-hand side mirror target area 224 for three seconds, then at the rearview mirror target area 228 for a half-second, and then back at the left-hand side mirror target area 224 for two seconds. Such an occurrence may be determined, for example by a driver monitoring system and/or computing module 330, to be a pattern, which may also be referred to as a transition sequence, e.g., changing a gaze from one target area to another. Further, as will be discussed, there may also be a minimum and/or maximum threshold amount of time associated with a gaze to a particular target area to be considered a valid gaze at that target area. For example, if a minimum threshold gaze time to a target area is one second, but a gaze to that target area exists for a half-second, then the gaze may not be considered valid or intentional. Such determinations may then be passed to computing module 330 to analyze and execute such data that may result in further actions by braking system 340, steering system 350, and speed control system 360.

Figure 4A:
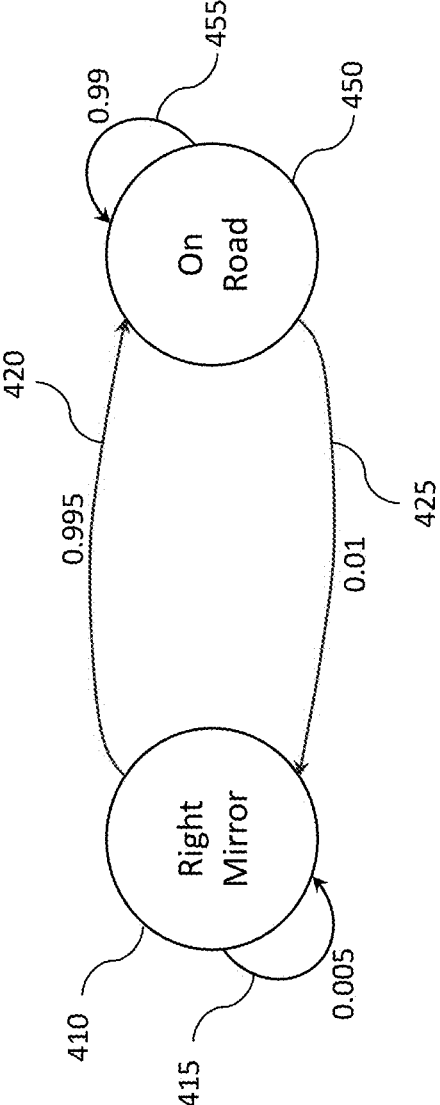
FIG. 4A and FIG. 4B are illustrations of probabilities of eye gaze pattern recognition systems, in accordance with the disclosure.
Figure 4B:
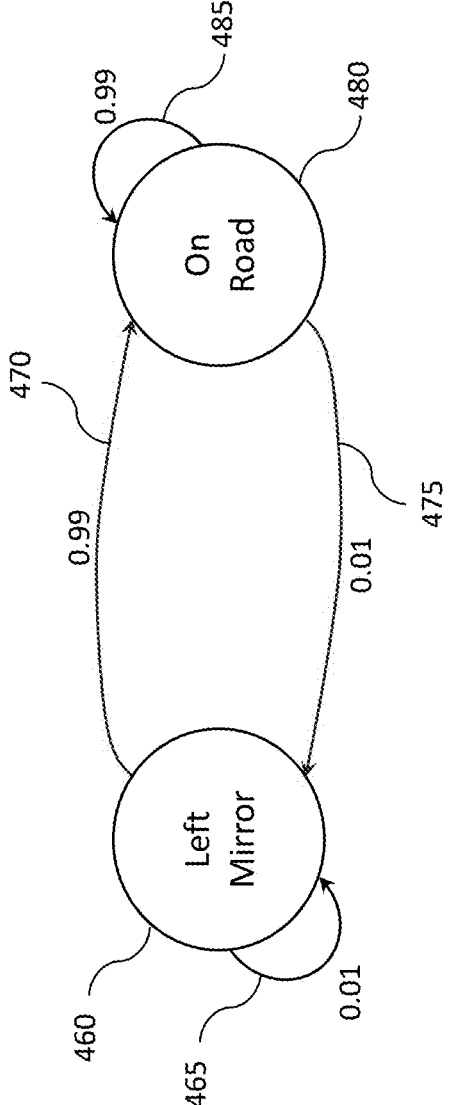

FIG. 4A and FIG. 4B are illustrations of probabilities associated with eye gaze transitions between target areas, according to an embodiment of the present disclosure. FIGS. 4A and 4B illustrate two-step, also referred to as a two-vertices, eye gaze sequence. The illustration of a two-step eye gaze sequence is an illustrative number of steps and may, in some embodiments, include fewer or additional number of steps. For example, a three-step eye gaze sequence between three target areas.

FIG. 4A data reflects thousands of miles of user data obtained from drivers in mixed driving conditions. Specifically, FIG. 4A illustrates a gaze pattern involving looking towards a right mirror target area on a vehicle with a transition to looking forward towards the oncoming roadway target area. For example, a driver may be looking straight ahead at the roadway, shown as roadway target area 450. According to the testing data there is a 99% probability that the user will continue to keep looking forward to the road, or in other words, cycle back to the roadway gaze as shown by probability 455.

However, there is also a 1% probability, shown as probability 425, that the driver will shift the gaze to the right-hand mirror target area 410. Once the eye gaze has shifted to the right-hand mirror target area 410 there is a 0.5% probability that the driver will cycle back to gaze at the right-hand mirror target area 410 as shown by probability 415. There is also a 99.5% probability that the driver will shift their gaze back to the roadway target area 450, as shown by probability 420. A gaze may also be defined to have a minimum duration. For example, a gaze may be considered valid if it persists for at least a threshold amount, such as for at least one second. In another embodiment, a gaze that persists for longer than another threshold, for example, five seconds, may not be considered a gaze, but rather a fixation. For example, the driver notices flashing red and blue lights in the rearview mirror and concentrates their gaze on that action for longer than the threshold time. Such upper-level thresholds will be discussed in further detail regarding pattern recognition.

In an analogous manner, FIG. 4B illustrates a gaze pattern involving looking towards a left mirror target area on a vehicle with a transition to looking forward towards the oncoming roadway target area. For example, a driver may be looking straight ahead at the roadway, shown as roadway target area 480. According to the testing data there is a 99% probability that the user will continue to keep looking forward to the road, or in other words, cycle back to the roadway gaze as shown by probability 485.

However, there is also a 1% probability, shown as probability 475, that the driver will shift the gaze to the left-hand mirror target area 460. Once the eye gaze has shifted to the left-hand mirror target area 460 there is a 1% probability that the driver will cycle back to gaze at the left-hand mirror target area 460 as shown by probability 465. There is also a 99% probability that the driver will shift their gaze back to the roadway target area 480, as shown by probability 470. As discussed, a gaze may also be defined to have a minimum duration. For example, a gaze may be considered valid if it persists for at least a threshold amount, such as for at least one second. In another embodiment, a gaze that persists for longer than another threshold, for example, five seconds, may not be considered a gaze, but rather a fixation.

Given the example gaze transition possibilities of FIG. 4A and FIG. 4B, an algorithm may be established to define a trigger pattern in recognition of a defined gaze transition pattern. For example, a gaze pattern may be defined to initiate a left/right lane change of a vehicle by its driver. The transition graphs of FIG. 4A and FIG. 4B may be associated with such patterns and that deliberate eye gaze manipulation and consequent probabilities of a driver's intent may exponentially increase with an increasing number of vertices, i.e., target areas such as a mirror or roadway, as a probability of accidental or unintended Euler cycles through an associated graph is decreasing as shown by:

$$P(X_n = i_n \mid X_{n-1} = i_{n-1}) = P(X_n = i_n \mid X_0 = i_0, X_1 = i_1, \ldots, X_{n-1} = i_{n-1})$$

In an embodiment, experimentation has shown that an optimal number of vertices for a "gaze direction" may be two or three vertices. As such, while it is plausible to create a longer transition sequence usage of additional vertices, such an approach may create additional burden on the user, e.g., driver, to execute such a sequence without inadvertently mis-completing or "breaking" the sequence. Further, limiting a particular sequence to initiate an action may assure a high level of driver engagement such that in the event of a false detection, the driver may be given sufficient time to recognize a false detection and override the maneuver.

In addition, while longer transition sequences may provide higher rejection potential for false detections, the use of fewer vertices, e.g., two or three, with an additional requirement that involves repetition may similarly increase the probability of true positive detection. For example, in an embodiment, experimental data showed that just a simple left mirror check resulted in less than a 5% probability of current intent detection, while a two vertex-based graph, e.g., a side mirror and a roadway ahead, may elevate the probability of correct detection using a four-step transition to greater than 90% probability. In one embodiment, a four-step transition to initiate a right lane change may include a gaze pattern that includes (1) a roadway to right-mirror gaze transition, (2) a right-mirror to roadway gaze transition, (3) a roadway to right-mirror gaze transition, and (4) a right-mirror to roadway gaze transition. In another embodiment, a four-step transition to initiate a left lane change may include (1) a roadway to left-mirror gaze transition, (2) a left-mirror to roadway gaze transition, (3) a roadway to left-mirror gaze transition, and (4) a left-mirror to roadway gaze transition.

The above reference to repetition may be regarding the number of repeated transitions, for example, in the above example of roadway to right/left-mirror and right/left-mirror to roadway, there exists two repetitions. In another example embodiment there may be more or fewer repetitions. In addition, the user, or driver, may also define their sequence of actions and an associated number of repetitions that make up a desired transition sequence or trigger pattern to initiate a desired vehicle action, for example a lane change. While a desired vehicle action may be described as a lane change, this is not meant to limit a desired action and may consist of other vehicle actions, for example headlight dim/bright control, engage/disengage cruise control. Further, such control may also be beneficial to impaired or disabled driver control.

Such probabilities for a right-hand mirror to roadway transition sequence may be shown as:

$$x_4 = M^4 x_0 \text{ where}$$

$$M = \begin{bmatrix} 0.99 & 0.005 \\ 0.01 & 0.995 \end{bmatrix} \text{ and } x_0 = \begin{array}{c} 1 \\ 0 \end{array}$$

While FIG. 4A and FIG. 4B present the concept of a side mirror target area, e.g., right mirror 410 and left mirror 460, and also the concept of a roadway target area, e.g., on-road 450 and on-road 480, there may also exist other defined target areas. For example, as shown in FIG. 2, target area 228 may represent a rearview mirror. The recognition of a predetermined transition sequence may require the driver gaze at the roadway target area for a threshold amount of time and then at a side mirror target area for another threshold amount of time. However, a driver may also occasionally cast a gaze at some form of intermediary target area, for example, the rearview mirror. In determining whether there is a valid predetermined transition sequence of eye gazes between different target areas the occurrence of gazing at an intermediary target area may be accommodated. For example, in one embodiment, if a gaze to an intermediary target area is for a duration of less than a particular threshold amount, then the transition sequence is not considered to be interrupted or terminated. However, if that gaze lasts for greater than the threshold time, for example as discussed above where the driver notices flashing red and blue lights in the rearview mirror, then the recognition or determination of the driver attempting to initiate a valid transition sequence may be considered terminated. Thus, in other words, a gaze at one or more intermediary target areas that exceeds a particular time threshold may no longer be considered a gaze, but rather referred to as a fixation, stare, or other appropriate term. In addition, an intermediary target area may be considered to be an area other than specifically described but is meant to be inclusive.

Figure 5:
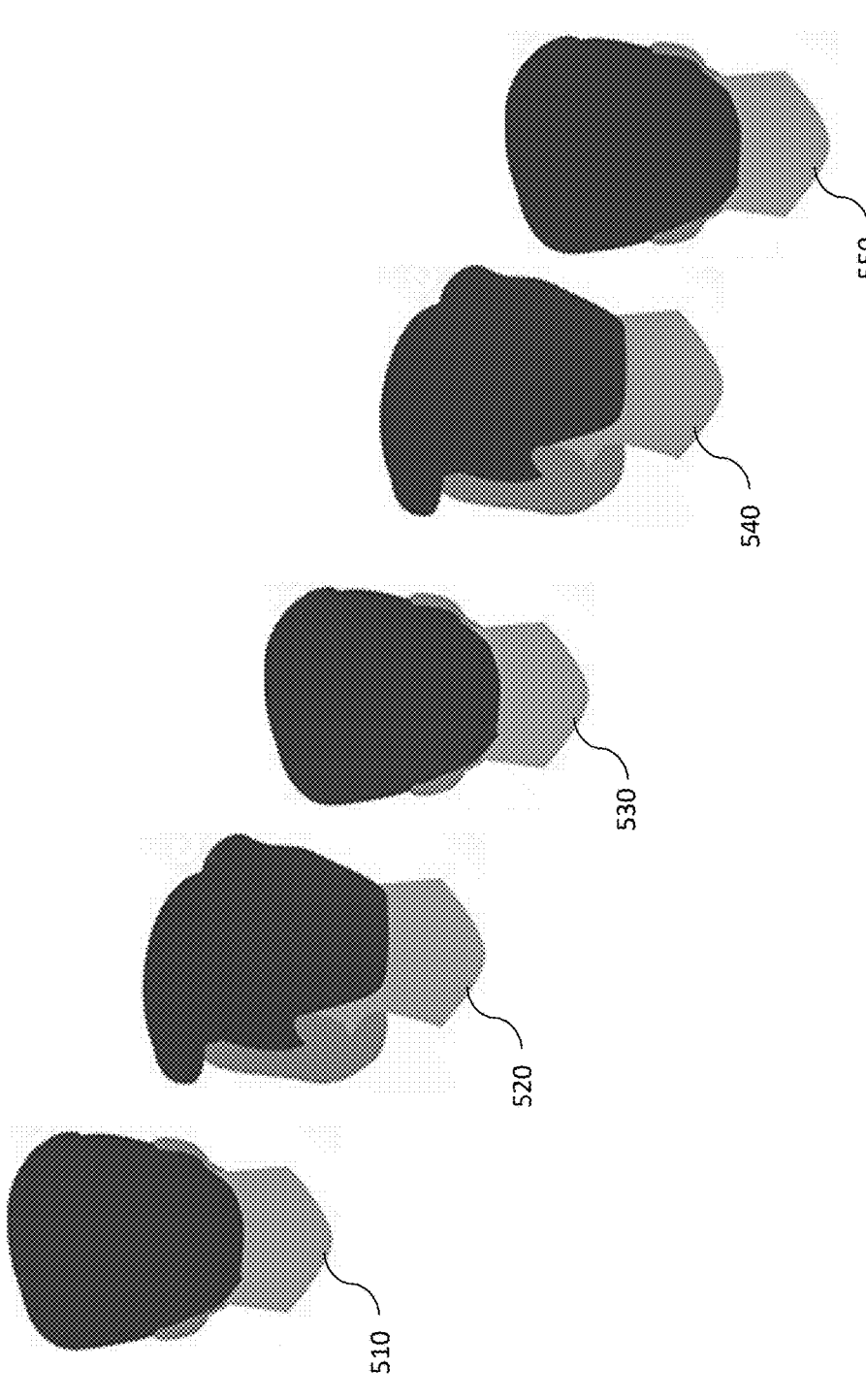
FIG. 5 is an illustration of pattern for recognition to initiate an automotive function, in accordance with the disclosure.

FIG. 5 is an illustration of a predetermined transition sequence 500 of eye gaze directions between two target areas, according to an embodiment of the present disclosure. As discussed in FIG. 4, an algorithm may be established to define a trigger pattern in recognition of a defined gaze transition pattern. For example, a gaze pattern may be defined to initiate a left/right lane change of a vehicle by its driver. In an embodiment, as illustrated by FIG. 5 from the viewpoint of the rear of the driver, a four-step transition to initiate a left lane change may include (1) a roadway to left-mirror gaze transition—from position 510 to position 520, (2) a left-mirror to roadway gaze transition—from position 520 to position 530, (3) a roadway to left-mirror gaze transition—from position 530 to position 540, and (4) a left-mirror to roadway gaze transition—from position 540 to position 550.

Figure 6:
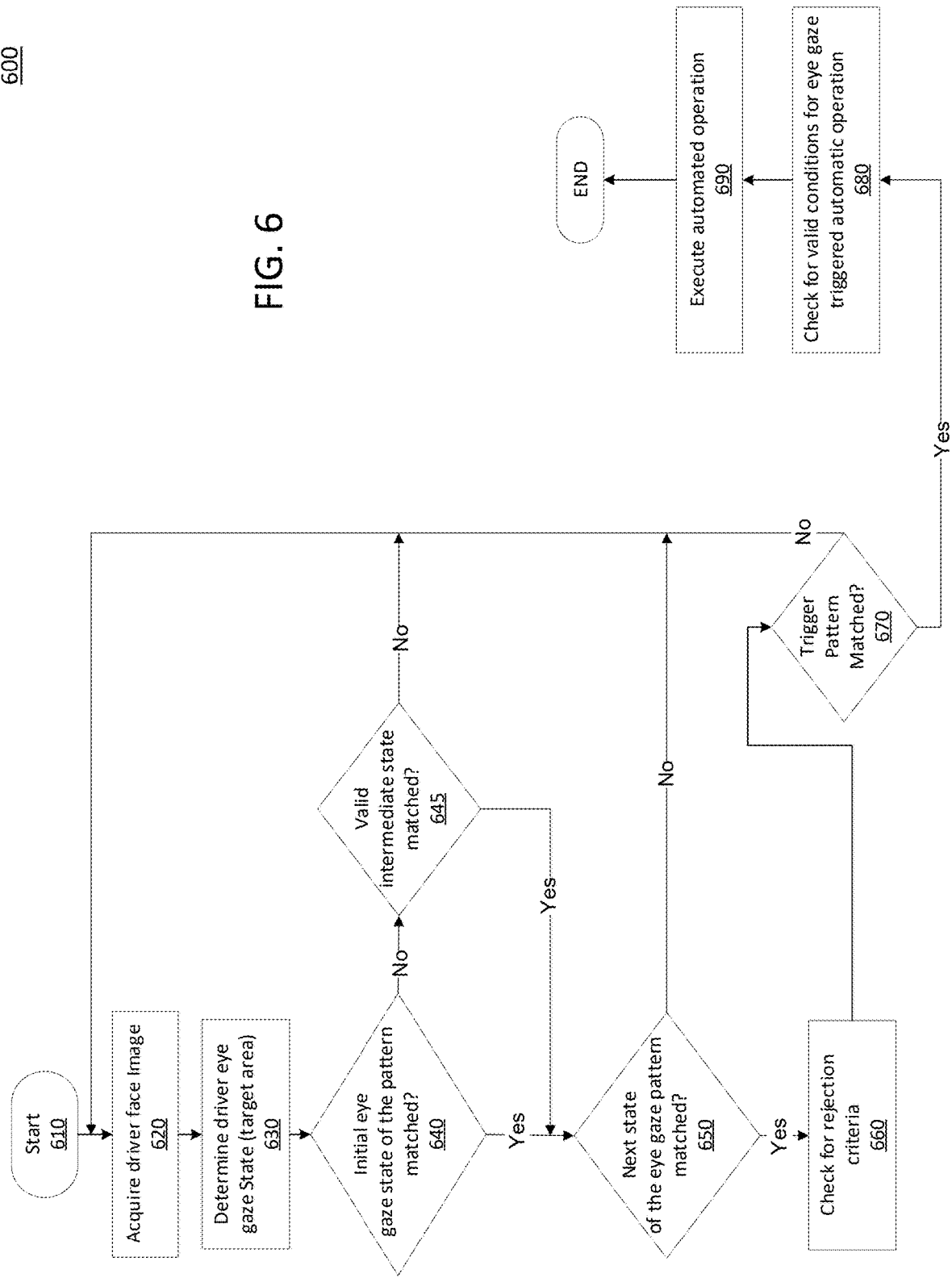
FIG. 6 depicts a flowchart of a process for vehicle lane change activation by eye gaze pattern recognition, in accordance with the disclosure.

FIG. 6 depicts a flowchart of a method 600 for vehicle lane change activation by eye gaze pattern recognition, according to an embodiment of the present disclosure. Step 610 marks the start of a recognition process to initiate an automated automotive operation, for example, the initiation of a lane change as discussed. At step 620 a facial image of the driver may be acquired. As described in FIG. 3, system 300 may operate in a mode where camera 312 produces an image stream of the vehicle operator's face including the eyes 313 and forwards that image stream to the driver monitoring system 320.

At step 630 a determination of the driver's eye gaze state may be determined. A driver's eye gaze state may also be referred to as the driver's target area gaze. The gaze state or target area gaze may be used to determine where the driver may be focusing their gaze at a particular point in time and may also determine the duration of such a gaze. As discussed in FIG. 3, FIG. 4A, and FIG. 4B, a target area may include objects such as the roadway, a side mirror, a rearview mirror, to name a few.

At step 640 a determination may be made if the driver's target area gaze, or state, matches a predefined pattern. As discussed, predefined patterns may exist to initiate various automotive functions. In addition, there may also be multiple possible predefined patterns, each with their own associated automotive function. At step 640 such a determination may be made, if there is a match with one or more predefined patterns, then the process may continue to step 650. Further, step 640 may also include a time duration component where the gaze, to be considered valid, may be required to have a duration greater than a first threshold value but possibly less than a second threshold value.

However, if there is not a match, then at step 645 a determination may be made as to whether the gaze matches an intermediary state or target. As discussed in FIG. 4A and FIG. 4B, a driver may also occasionally cast a gaze at some form of intermediary target area, for example, the rearview mirror, such as that described in FIG. 2 at target area 228. If the intermediary target area is defined as an acceptable area, then the process may continue to step 650. Determining whether the intermediary target area at step 645 is matched may also include a time or duration context. For example, if the driver gazes at the intermediary target area for less than a particular threshold duration then the gaze is acceptable, and the process may continue to step 650. However, if the gaze duration exceeds the threshold duration value, then the gaze may be deemed unacceptable or where the pattern may be considered terminated or broken and then process may be directed back to step 620.

At step 650 the process may continue to check for a next state of the eye gaze pattern to determine if the gaze matches a next state or target area in the predetermined sequence pattern. As in step 640 or step 645, there may also be a time duration component where the gaze, to be considered acceptable, may be required to have a duration greater than a first threshold value but possibly less than a second threshold value. If the target area gaze or state matches a predefined pattern, then the process may continue to step 660. If not, then the process may revert back to step 620. In an embodiment, as discussed in FIG. 6, if there is a failure to match a gaze state or target area gaze with the expected target area gaze of the predetermined sequence pattern, the process of acquiring the facial image and determining the driver eyes gaze state or target area gaze is reset or terminated and initialized.

At step 660 the process may check for a rejection criterion. While not specifically addressed in this disclosure, the process may be terminated for a number of reasons including other automotive conditions, for example, a sensor may indicate the presence of another vehicle in the lane in which the driver is attempting to change into. Other conditions may also be present that may be considered to reject the driver request to initiate an automated operation, for example excessive speed or other sensor input data.

If no such conditions are detected the process may continue to step 670 at which point it may be determined whether the entire predetermined transition sequence or pattern has been matched. If not, the process may continue with additional image capture and recognition until the trigger pattern or predetermined transition sequence has been matched. Once matched the process may continue to step 690 in which one or more additional conditions to satisfy execution of the automated vehicle operation may be evaluated. If acceptable, then the process may continue to step 680 in which the automated operation is executed. The process may then end.

FIG. 7 illustrates a detail flowchart of a method 700 for vehicle lane change activation by eye gaze pattern recognition, according to an embodiment of the present disclosure. Step 705 may include capturing and sending, using an inward-looking camera situated in the vehicle, a video stream of a face of a driver to a computing module controller. As discussed in FIG. 3, system 300 may include an inward facing camera component 310 that may include a camera 312 directed to the face and eyes 313 of the vehicle operator. Camera 312 may be a type of imaging device including but not limited to an optical camera, an infrared imaging device, a light-emitting-diode (LED) device, an ultrasound sensor and the like. Further, system 300 may operate in a mode where camera 312 produces an image stream of the vehicle operator's face including the eyes 313 and forwards that image stream to the driver monitoring system 320.

Step 710 may include estimating, by the computing module controller, e.g., the driver monitoring system 320 and the computing module 330, based on the video stream, a series of gaze directions of the driver. As discussed in FIG. 3, driver monitoring system 320, in its detection and estimating the direction of a gaze by the driver, may determine that a gaze is directed to a specific location or target area within the vehicle, for example, target area 228 that may represent the rearview mirror. target area 224 that may represent the left-hand side mirror, and target area 226 that may represent the right-hand side mirror.

Step 715 may include associating, by the computing module controller, the series of eye gaze directions, with one or more target areas. As previously discussed, an eye gaze direction may be associated with one or more particular target areas. In step 715, the computing module controller, e.g., the driver monitoring system 320 and computing module 330, may determine if and when a driver's gaze may be directed to a particular target area. Such target areas may include target area 228 that may represent the rearview mirror, target area 224 that may represent the left-hand side mirror, and target area 226 that may represent the right-hand side mirror as discussed in FIG. 2. Target areas, or eye gaze states, may be associated with one or more particular eye gaze patterns or transition sequences that may be associated with a desired automated automotive action, such as changing lanes.

Step 720 may include recognizing, by the computing module controller, a predetermined transition sequence in the series of eye gaze directions of the driver between a first target area and a second target area, wherein the recognition of the predetermined transition sequence occurs within a first threshold amount of time. As discussed in FIG. 3, the computing module 330 may analyze the captured image data to determine if the changes in the gaze directions of the driver from one target area to another may constitute the existence of a pattern. Further, as discussed in FIG. 3, there may also be a minimum and/or maximum threshold amount of time associated with a gaze to a particular target area to be considered a valid gaze at that target area. For example, if a minimum threshold gaze time to a target area is one second, but a gaze to that target area exists for just a half-second, then the gaze may not be considered valid or intentional. Such determinations may then be passed to computing module 330 to analyze and execute such data that may result in further actions by braking system 340, steering system 350, and speed control system 360.

Step 725 may include triggering, by the computing module, based on the recognition of the predetermined transition sequence in the series of eye gaze directions between the first target area and the second target area, an initiation of a lane change of the vehicle on a roadway. As discussed in FIG. 6, the recognition of a number of gaze states, or target area gazes as shown in steps 630, 640, 645, and 650 may be used to determine if a series of eye gazes are directed to target areas and if the sequence of those gazes constitutes a pattern or match of a predetermined transition sequence of gazes. Matching of such a sequence may then initiate an automated operation as shown in step 690 of FIG. 6.

Step 730 may include a number of criteria regarding time thresholds associated with the recognition of a sequence of eye gazes between various targets. Step 730 may thus include recognizing the predetermined transition sequence between the first target area and the second target area comprises an eye gaze in the first target area direction of an intended lane change for a time duration exceeding a second threshold but less than a third threshold, followed by an eye gaze in the second target area direction of travel on the roadway for a time duration exceeding the second threshold but less than the third threshold, followed by an eye gaze in the first target area direction of the intended lane change for a time duration exceeding the second threshold but less than the third threshold, followed by an eye gaze in the second target area direction of travel on the roadway for a time duration exceeding the second threshold but less than the third threshold. In other words, there may be a first threshold where an entire sequence of eye gaze movements between various target areas should be completed within a certain time in order to be considered valid. In addition, there may also, in some embodiments, be a second threshold time requirement in which the driver may maintain an eye gaze at a particular target area in order for that gaze to be considered valid. Further, in some embodiments, there may also be a third threshold time requirement in which the driver may not exceed that time in which an eye gaze is directed at a target area, such as the discussed example of the driver detecting flashing lights in the rearview mirror, in which a sequence of eye gaze movements between target areas may be interrupted by a fixation of a gaze, thus exceeding the third threshold time limit. Such thresholds are meant to be illustrative and non-limiting as other combinations of threshold time constraints may be used without departing from the intent of this disclosure.

Method 700 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for vehicle lane change activation by eye gaze pattern recognition comprising:

an inward-looking camera, situated in a vehicle, and configured to capture and send a video stream of a face of a driver to a computing module controller;

the computing module controller, based on the video stream, is configured to estimate a series of eye gaze directions of the driver;

the computing module controller is further configured to associate the series of eye gaze directions with a plurality of target areas;

the computing module controller further configured to recognize a predetermined transition sequence in the series of eye gaze directions of the driver between a first target area and a second target area, wherein;

the first target area is in a first direction of an intended lane change;

the second target area is in a second direction of travel on a roadway;

the recognition of the predetermined transition sequence occurs within a first threshold amount of time; and the predetermined transition sequence between the first target area and the second target area comprises:

a first eye gaze in the first direction of the first target area for a first time duration exceeding a second threshold but less than a third threshold, followed by a second eye gaze in the second direction of the second target area for a second time duration exceeding the second threshold but less than the third threshold, followed by a third eye gaze in the first direction of the first target for a third time duration exceeding the second threshold but less than the third threshold, followed by a fourth eye gaze in the second direction of the second target area for a fourth time duration exceeding the second threshold but less than the third threshold; and the computing module controller is further configured to, based on the recognition of the predetermined transition sequence in the series of eye gaze directions between the first target area and the second target area, trigger an initiation of an actual lane change of the vehicle on the roadway.

2. The system of claim 1, wherein:

the first target area is a side view mirror of the vehicle.

3. The system of claim 1, wherein:

if the first time duration of the first eye gaze in the first direction exceeds the third threshold, the recognition of the predetermined transition sequence is terminated.

4. The system of claim 1, wherein:

if the second time duration of the second eye gaze in the second direction exceeds the third threshold, the recognition of the predetermined transition sequence is terminated.

5. The system of claim 1, wherein:

if the series of eye gaze directions includes one or more intermediary eye gazes outside at least one of the first target area and the second target area for an intermediary time duration that is greater than the second threshold, the recognition of the predetermined transition sequence is terminated.

6. The system of claim 1, wherein:

if the third time duration of the third eye gaze in the first direction is less than the second threshold, then the recognition of the predetermined transition sequence is terminated.

7. The system of claim 1, further comprising:

a feedback device configured to generate at least one of a visual signal, an auditory signal, and a haptic signal to indicate the initiation of the actual lane change of the vehicle on the roadway.

8. The system of claim 1, further comprising:

an input sensor configured to receive one or more rejection signals to abort the initiation of the actual lane change of the vehicle on the roadway.

9. The system of claim 1, wherein:

the second threshold is approximately one second.

10. The system of claim 1, wherein:

the third threshold is approximately five seconds.

11. A method for vehicle lane change activation by eye gaze pattern recognition comprising:

capturing and sending, using an inward-looking camera situated in a vehicle, a video stream of a face of a driver to a computing module controller;

estimating, by the computing module controller, based on the video stream, a series of eye gaze directions of the driver;

associating, by the computing module controller, the series of eye gaze directions, with a plurality of target areas;

recognizing, by the computing module controller, a predetermined transition sequence in the series of eye gaze directions of the driver between a first target area and a second target area, wherein:

the first target area is in a first direction of an intended lane change;

the second target area is in a second direction of travel on a roadway;

the recognizing of the predetermined transition sequence occurs within a first threshold amount of time; and the predetermined transition sequence between the first target area and the second target area comprises:

a first eye gaze in the first direction of the first target area for a first time duration exceeding a second threshold but less than a third threshold, followed by a second eye gaze in the second direction of the second target area for a second time duration exceeding the second threshold but less than the third threshold, followed by a third eye gaze in the first direction of the first target for a third time duration exceeding the second threshold but less than the third threshold, followed by a fourth eye gaze in the second direction of the second target area for a fourth time duration exceeding the second threshold but less than the third threshold; and triggering, by the computing module controller, based on the recognizing of the predetermined transition sequence in the series of eye gaze directions between the first target area and the second target area, an initiation of an actual lane change of the vehicle on the roadway.

12. The method of claim 11, wherein:

the first target area is a side view mirror of the vehicle.

13. The method of claim 11, wherein:

if the first time duration of the first eye gaze in the first direction exceeds the third threshold, terminating the recognizing of the predetermined transition sequence-is-terminated.

14. The method of claim 11, wherein:

if the second time duration of the second eye gaze in the second direction exceeds the third threshold, terminating the recognizing of the predetermined transition sequence.

15. The method of claim 11, wherein:

if the series of eye gaze directions includes one or more intermediary eye gazes outside at least one of the first target area and the second target area for an intermediary time duration that is greater than the second threshold, terminating the recognizing of the predetermined transition sequence.

16. The method of claim 11, wherein:

if the third time duration of the third eye gaze in the first direction of is less than the second threshold, terminating the recognizing of the predetermined transition sequence.

17. The method of claim 11, further comprising:

generating at least one of a visual signal, an auditory signal, and a haptic signal by a feedback device to indicate the initiation of the actual lane change of the vehicle on the roadway.

18. The method of claim 11, further comprising:

monitoring for a receipt of one or more rejection signals to abort the initiation of the actual lane change of the vehicle on the roadway.

19. The method of claim 11, wherein:

the second threshold is approximately one second; and
the third threshold is approximately five seconds.

20. A method for vehicle lane change activation by eye gaze pattern recognition comprising:

capturing and sending, using an inward-looking camera situated in a vehicle, a video stream of a face of a driver to a computing module controller;

estimating, by the computing module controller, based on the video stream, a series of eye gaze directions of the driver;

associating, by the computing module controller, the series of eye gaze directions, with a plurality of target areas;

recognizing, by the computing module controller, a predetermined transition sequence in the series of eye gaze directions of the driver between a first target area and a second target area, wherein:

the first target area is in a first direction of an intended lane change;

the second target area is in a second direction of travel on a roadway;

the recognizing of the predetermined transition sequence occurs within a first threshold amount of time; and the recognizing of the predetermined transition sequence comprises:

a first eye gaze in the first direction of the first target area for a first time duration exceeding a second threshold but less than a third threshold;

followed by a second eye gaze in the second direction of the second target area for a second time duration exceeding the second threshold but less than the third threshold;

followed by a third eye gaze in the first direction of the first target area for a third time duration exceeding the second threshold but less than the third threshold; and followed by a fourth eye gaze in the second direction of the second target area for a fourth time duration exceeding the second threshold but less than the third threshold;

terminating the recognizing of the predetermined transition sequence in response to the first time duration of if the first eye gaze in the first direction exceeding the third threshold;

terminating the recognizing of the predetermined transition sequence in response to the second time duration of the second eye gaze in the second direction exceeding the third threshold;

wherein the first target area is a side view mirror of the vehicle, terminating the recognizing of the predetermined transition sequence in response to:

the series of eye gaze directions includes one or more intermediary eye gazes outside at least one of the first target area and the second target area; and the one or more of the intermediary eye gazes occurs for an intermediary time duration that is greater than the second threshold;

terminating the recognizing of the predetermined transition sequence in response to the first time duration of the first eye gaze in the first direction is less than the second threshold;

wherein the second threshold is approximately one second;

wherein the third threshold is approximately five seconds;

triggering, by the computing module controller, based on the recognizing of the predetermined transition sequence in the series of eye gaze directions between the first target area and the second target area, an initiation of an actual lane change of the vehicle on the roadway;

generating at least one of a visual signal, an auditory signal, and a haptic signal by a feedback device to indicate the initiation of the actual lane change of the vehicle on the roadway; and monitoring for a receipt of one or more rejection signals to abort the initiation of the actual lane change of the vehicle on the roadway.

* * * * *